Nov. 11, 1958 A. D. HALL 2,860,258

TRANSISTOR DECADE COUNTER

Filed Sept. 17, 1954

INVENTOR
A. D. HALL
BY H. A. Burgess
ATTORNEY

United States Patent Office 2,860,258

Patented Nov. 11, 1958

2,860,258

TRANSISTOR DECADE COUNTER

Arthur D. Hall, Berkeley Heights, N. J., assignor to Bell Telephone Laboratories, Incorporated, New York, N. Y., a corporation of New York Application September 17, 1954, Serial No. 456,778

2 Claims. (Cl. 307—88.5)

This invention relates to decade counters and, more particularly, to such devices utilizing transistors.

A variety of decade counters now well known in the art employ electron discharge devices, gas-filled tubes, or relays to perform counting functions. Such counters suffer from a number of deficiencies including restrictions on speed of operation, low efficiency and relatively high power and excessive space requirements.

It has been proposed heretofore to utilize transistors in decade counters. Illustrative of suggestions of this nature are those disclosed in Patent 2,531,076, granted November 21, 1950, to R. R. Moore. The use of transistors overcomes some of the deficiencies in relay and electron discharge device counters. For example, the power and space requirements are reduced. However, even in transistorized counters of constructions suggested heretofore the number of transistors requisite is substantially greater than the theoretical minimum of four, this quantity being established by a simple mathematical analysis of a decade counter comprising $n$ binary stages, in which $2^n$ equals the maximum number of units that can be counted by the counter. Since $2^3$ equals 8, it can be seen that a minimum of four binary stages is required in a decade counter. Further, such systems entail complexity of circuitry and necessitate the use of an unduly large number of circuit components.

One general object of this invention is to improve decade counters.

More specifically, objects of this invention are to simplify the circuitry of decade counters, to minimize the number of transistors requisite therein, and to reduce the number of associated components required.

In accordance with one feature of this invention, in a decade counter utilizing transistors, the transistors and associated elements are connected to perform with great efficiency, whereby the total number of elements required is substantially minimized; that is particularly, the number of transistors necessary is the theoretical minimum of four.

More specifically, in accordance with one feature of this invention, four single-transistor trigger stages are connected in tandem and by means of a delay line connecting the first and second stages, a circuit coupling the first and fourth stages and a circuit coupling the fourth and second stages, the counter is made to reset in response to the tenth input pulse. A plurality of these decade counters may be connected in tandem and will count in tens, hundreds, etc.; that is, they will count up to $10^n$, where $n$ is the number of such decade counters.

In accordance with another feature of this invention, the transistors and associated elements are constructed and arranged to enable response of the counter to impulses of the same polarity applied to a single set of input terminals, whereby the circuitry is substantially simplified.

More specifically in accordance with another feature of this invention, a steering network is provided which alternately steers input pulses to the transistor emitter and the base electrodes, thereby causing the transistor to change from one stable state to another alternately.

The invention and the above-noted and other features thereof will be understood more clearly and fully from the following detailed description with reference to the accompanying drawing in which.

Figure 1:
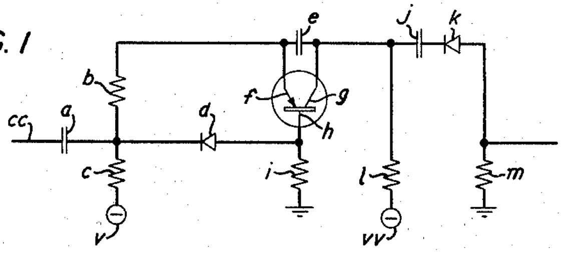
Fig. 1 is a schematic diagram of a single transistor trigger stage.

Fig. 1 depicts the circuit of a single transistor trigger stage illustrative of each of the four trigger stages which form a part of the counter of this invention. *v* and *vv* identify external sources of potential which are used to supply operating bias to the stage, *cc* is the input terminal, *a* is the input direct-current blocking capacitor, *b, c, i, l* and *m* are bias and load resistors, *d* and *k* are assymetrical conducting devices commonly known as varistors, *j* is the output direct-current blocking capacitor, *e* is a feedback capacitor, and *f, g* and *h* comprise transistor emitter, collector and base electrodes, respectively. The transistor here shown is of the point contact type and is characterized by a ratio of short-circuit collector current to emitter current which exceeds unity for electrode current voltage conditions within a preassigned range. Associated components are chosen and arranged to produce a transistor negative variational resistance characteristic over a range lying between two stable regions. For a more detailed description of transistors which may be employed, reference is hereby made to Patent No. 2,595,208, issued to J. T. Bangert on April 29, 1952.

Upon application of pulses of negative polarity to input terminal *cc*, the trigger stage operates in the following manner: the pulses travel through capacitor *a* which provides a low impedance to the pulses but which blocks any direct-current component which may have been associated therewith. The pulses now arrive at the junction of resistor *b*, resistor *c*, asymmetrical conducting device *d* and capacitor *a* the first three of these elements comprising a steering network which alternately directs pulses to transistor emitter *f* or transistor base *h* depending upon which of two stable states the transistor is in when a pulse is received. This steering is accomplished as a result of change in bias across asymmetrical conducting device *d* when the transistor changes from one of its stable states to the other. Defining these two stable states as being an "off" state and an "on" state, the former occurring when emitter current is at or near zero and collector current is low, and the latter occurring when emitter, base and collector currents are relatively high; and arbitrarily assuming that said stage is in the "off" condition when a pulse is applied, the transistor base *h* is biased slightly less negatively than the junction point between resistors *b* and *c* and device *d* so that device *d* is in its conducting, low resistance state, the bias across device *d* being produced by voltages developed across resistors *i* and *c*. Current flows from ground through resistor *i*, and thereafter a part flows from transistor base *h* to transistor collector *g*, the remainder flowing through device *d*, and thence through resistor *c* to voltage source *v*. Under these conditions, device *d* is in its conducting low resistance state and when the first negative input pulse arrives at the steering network input point, it finds the path to the transistor base *h* offering substantially less impedance than the path through resistor *b* to transistor emitter *f*. The pulse therefore appears at transistor base *h* and drives it more negative. Since a negative increment on the base is equivalent to a positive increment on the emitter, the emitter begins to conduct. Under these conditions, the current gain of the transistor is large and results in a greater current flow in the collector *g*. Since emitter and collector currents flow in opposite directions into base resistor *i*, the larger collector current flowing from ground to the base causes the base to become more negative. This change in base potential is in the same direction as that caused by the pulse, and therefore the change continues until incremental emitter currents are just balanced by corresponding incremental collector currents, the trigger stage then being in its second stable state or "on" condition.

The next pulse arriving at the input terminal *cc* finds its path to the transistor base *h* effectively blocked by device *d* which is now in its high resistance, non-conducting state. While the transistor is in its conducting or "on" state, current flowing to the base through resistor *i* maintains the base at a potential more negative than that of the steering network input point, thereby subjecting device *d* to a reverse bias which makes it highly resistive. The input pulse therefore now finds its path to emitter *f* substantially lower in impedance than the path through device *d*. The pulse then reacts on the emitter to drive it more negative, thereby reducing its current and effecting a corresponding large reduction in collector current which, in turn, reduces the voltage drop across base resistor *i*. Since this change is in the same direction as that caused by the initiating pulse, the change continues until the emitter current reaches zero, the stage having thus returned to its initial stable, low conducting state.

Capacitor *e* is connected between emitter *f* and collector *g* in order to increase transient feedback and thereby assist the transistor to trigger from one stable state to the other.

Coincident with the above-described changes from one stable state to another, the voltage at the transistor collector *g* varies substantially, becoming less negative in the "on" condition than in the "off" condition due to the change in voltage developed across collector resistor *l* in response to the above-described change in collector current. These voltage swings are differentiated by capacitor *j* and resistor *m*. If asymmetrical conducting device *k* were not in the circuit, differentiation of collector voltage swings would result in successive negative and positive pulses, each pulse resulting from one negative input pulse. However, device *k* effectively blocks positive pulses, thereby conditioning the circuit to produce an output of one negative pulse in response to each two successive negative input pulses.

Figure 2:
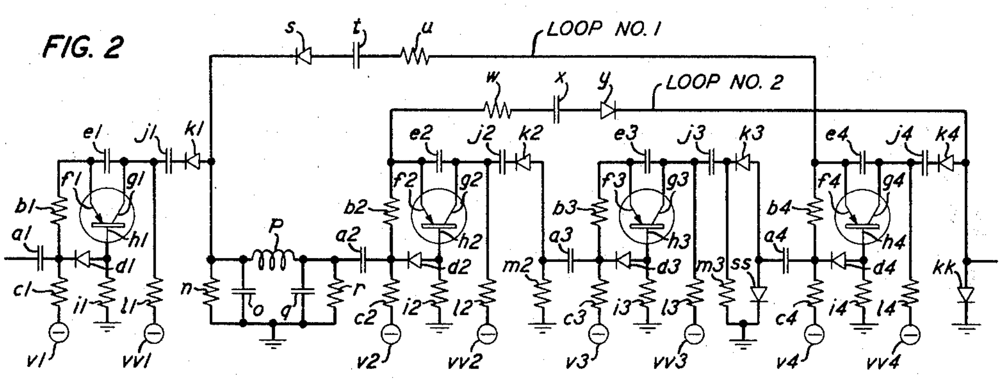
Fig. 2 is a circuit diagram of a decade counter comprising four single-transistor trigger stages and interconnecting coupling circuits.
Figure 3:
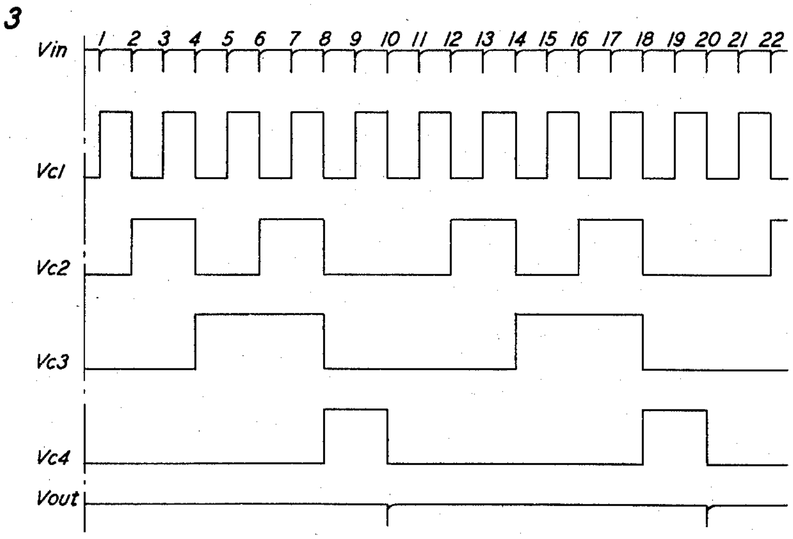
Fig. 3 is a diagram showing the decade counter input and output pulses together with transistor collector potentials in each of the four stages.

Four of the above-described trigger stages are connected in tandem to form a counter which produces one negative output pulse in response to each ten successive negative input pulses in the manner now to be described. Referring to Fig. 2, it will be noted that circuit elements comprising each stage have been identified with letters corresponding to those used for identification in Fig. 1, together with numerical suffixes corresponding to the numerical sequence of connection of the stages. Fig. 3 shows curves relating to voltage conditions occurring at the decade counter input terminals, the output terminals and the collector electrodes of each individual stage.

Referring again to Fig. 2, it will be noted that each individual stage is identical to that shown in Fig. 1 except for certain changes in the connections between stages which will be described in detail below. With each stage initially in the "off" condition, the first input pulse triggers the first stage to its "on" condition which results in a sharp rise in collector potential as shown by the curve labeled $Vc1$ in Fig. 3. This change in voltage produces no change in stage 2, however, because the positive pulse produced by this voltage swing is blocked by asymmetrical current device *k1*. The second input pulse switches stage 1 back to its "off" condition and produces a resulting swing of collector potential back to its initial value, thus producing a negative output pulse which is fed to the emitter *f4* of stage 4 through asymmetrical current device *s*, capacitor *t*, and resistor *u*, and is also fed to the input steering circuit of stage 2 through a delay line comprising resistor *n*, capacitor *o*, inductor *p*, capacitor *q* and resistor *r*, and through direct-current blocking capacitor *a2*. The pulse arriving at stage 4 produces no change because stage 4 is in the "off" condition and its emitter current is zero. The negative pulse applied to the emitter tends to reduce emitter current, but since this current is zero, the pulse cannot reduce it and therefore has no effect. On the other hand, the pulse arriving at the input of stage 2 is steered by the input circuit so as to produce a change in stage 2 from its "off" to its "on" state. This change is represented by the sharp increase in collector potential shown by the curve labeled $Vc2$. The third input pulse switches stage 1 back to its "on" condition but has no other effect for the reasons explained above. The fourth input pulse switches stage 1 back to its "off" condition which results in a negative pulse being transmitted to the input of stage 2 and to the emitter of stage 4. The latter produces no effect since stage 4 is still in its "off" condition. The former switches stage 2 from its "on" to its "off" condition, thereby producing a sharp decrease in collector potential and a resulting negative output pulse which is transmitted to the input of stage 3 and triggers it from its "off" to its "on" condition, thereby producing a sharp increase in its collector potential as shown by the curve labeled $Vc3$ in Fig. 3. Input pulse 5 switches stage 1 from its "off" to its "on" condition but produces no other effect. Input pulse 6 switches stage 1 to it "off" condition and thus produces a negative pulse which is again fed to the emitter circuit of stage 4 and the input circuit of stage 2. As before, no change is produced in stage 4 because it remains in its "off" condition. However, this pulse changes stage 2 from its "off" to its "on" condition. Again, this change produces no stage 2 output pulse and so the sixth input pulse has no further effect. The seventh input pulse switches stage 1 to its "on" condition but has no other effect. Pulse 8 switches stage 1 to "off" thereby producing a negative output pulse from stage 1 which again is fed to the emitter of stage 4 and to the input circuit of stage 2. This pulse switches stage 2 to "off," thereby producing a stage 2 negative output pulse which, in turn, switches stage 3 off, thereby producing a stage 3 negative output pulse which is fed into the input circuit of stage 4 and turns it on. Essentially simultaneous with the arrival of the negative input pulse at the input of stage 4, the negative output pulse from stage 1 appears at the stage 4 emitter. These two pulses tend to produce opposite conditions, that is, the input pulse to stage 4 attempts to turn it on, and the pulse at the emitter tends to turn it off. However, resistor *u* provides sufficient attenuation of the pulse arriving at the emitter to assure its being overcome by the normal input pulse which therefore succeeds in turning on stage 4. Pulse 9 produces no effect other than to turn on stage 1.

The tenth input pulse to the counter comprising four tandemly-connected stages, would ordinarily turn off the first stage, thereby turning on the second stage, but would have no further effect. However, in counters constructed in accordance with this invention, the tenth input pulse turns off stage 1, prevents stage 2 from being turned on, leaves stage 3 off, and turns off stage 4 in the following manner: the tenth input pulse turns off stage 1 and in so doing produces a negative output pulse from stage 1. This pulse is fed through device *s*, capacitor *t* and resistor *u* to the emitter of stage 4, which being on, is thereby turned off. Stage 4, in changing to "off," delivers a negative output pulse as is shown by curves $Vc4$ and $V_{out}$ in Fig. 3. A part of this output pulse is fed back to the emitter of stage 2, and arrives at the emitter at the same time that the input pulse fed directly from stage 1 through the delay line arrives at the stage 2 input terminal. The feedback pulse is the stronger and therefore keeps stage 2 from being switched on by the pulse arriving from stage 1. Stage 3 receives no pulse and remains off. All four stages are now in the "off" condition and the counter has delivered one negative output pulse in response to ten negative input pulses.

Asymmetrical current device *ss* prevents collector *g*3 from being triggered in response to the tenth input pulse by a positive pulse derived from the emitter of stage 4 as it switches to "off."

The electrical time delay network connecting stages 1 and 2 is one representative type of electrical time delay means and is provided to delay pulses arriving at the stage 2 input circuit by an amount sufficient to allow the feedback pulse from the stage 4 collector to arrive at the stage 2 emitter coincident therewith. It should be understood, however, that other time delay means, for example, a short length of transmission line such as coaxial cable, may be utilized.

What is claimed is:

1. A decade counter comprising four single-transistor trigger stages connected in tandem, means for applying input pulses to the first stage and means for resetting the counter upon application of the tenth input pulse, said resetting means comprising coupling between the collector of the first stage and emitter of the fourth stage to transmit to said fourth stage a pulse to reset said fourth stage in response to the tenth input pulse, coupling between the collector of the fourth stage and the emitter of the second stage to transmit a pulse to said second stage in opposition to the normal input pulse thereto, thereby to prevent said second stage from changing from the reset condition in response to the tenth input pulse, and a pulse delaying device connecting the output of the first stage to the input of the second stage.

2. A decade counter comprising four single-transistor trigger stages connected in tandem, each stage comprising a transistor having a semiconductive body and a base electrode, an emitter electrode and a collector electrode in contact with said body, said transistor being characterized by a ratio of short-circuit collector current to emitter current which exceeds unity for electrode current voltage conditions within a preassigned range, an external network interconnecting said electrodes and including a potential source for establishing current voltage conditions within said range, said network comprising a current path by way of which current is regeneratively fed back from the collector to the emitter in amount sufficient to give rise to a negative variational resistance characteristic within said range, said network also including an impedance element operative to determine the extent of said range and a steering network connected to said emitter and base electrodes for alternately steering input pulses to first one and then the other of said electrodes, whereby said trigger stage is caused to alternate between stable operating conditions in response to said input pulses; means for applying input pulses to the first stage, and means for resetting the counter upon application of the tenth input pulse, said resetting means comprising coupling between the collector of the first stage and emitter of the fourth stage to transmit to said fourth stage a pulse to reset said fourth stage in response to the tenth input pulse, coupling between the collector of the fourth stage and the emitter of the second stage to transmit a pulse to said second stage in opposition to the normal input pulse thereto, thereby to prevent said second stage from changing from the reset condition in response to the tenth input pulse, and a pulse delaying device connecting the output of the first stage to the input of the second stage.

References Cited in the file of this patent

UNITED STATES PATENTS

| | | |
|---|---|---|
| 2,533,001 | Eberhard | Dec. 5, 1950 |
| 2,538,122 | Potter | Jan. 16, 1951 |
| 2,584,811 | Phelps | Feb. 5, 1952 |
| 2,652,501 | Wilson | Sept. 15, 1953 |
| 2,655,607 | Reeves | Oct. 13, 1953 |
| 2,772,370 | Bruce et al. | Nov. 27, 1956 |
| 2,773,983 | Baker et al. | Dec. 11, 1956 |